(12) United States Patent
Iwasaki

(10) Patent No.: US 6,304,324 B1
(45) Date of Patent: Oct. 16, 2001

(54) METHOD OF CALCULATING OPTICAL FREQUENCY SPECTRUM

(75) Inventor: Takashi Iwasaki, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/316,064

(22) Filed: May 21, 1999

(30) Foreign Application Priority Data

May 25, 1998 (JP) .................................................. 10-143466

(51) Int. Cl.[7] ....................................................... G01J 3/42
(52) U.S. Cl. ..................... 356/320; 356/302; 356/319; 356/320; 356/213
(58) Field of Search .................. 356/213, 300, 356/302, 319, 320

(56) References Cited

U.S. PATENT DOCUMENTS 5,691,701 * 11/1997 Wohlstein et al. .................... 356/320
5,774,213 * 6/1998 Trebino et al. ....................... 356/320

FOREIGN PATENT DOCUMENTS

| | | |
|---|---|---|
| 0 840 101 A1 | 5/1998 | (EP) . |
| 2 119 086 | 11/1983 | (GB) . |
| 6-221922 | 8/1994 | (JP) . |
| 10-132660 | 5/1998 | (JP) . |

* cited by examiner

Primary Examiner—Frank G. Font
Assistant Examiner—Reginald A. Ratliff
(74) Attorney, Agent, or Firm—Finnegan, Henderson, Farabow, Garrett & Dunner, L.L.P.

(57) ABSTRACT

A method of calculating optical frequency spectrum for use in an optical-spectrum measuring apparatus for measuring optical spectrum characteristics of a light source. In the method, a bandwidth storage section stores a characteristic of a bandwidth of passed wavelengths with respect to a measuring wavelength of a spectrometer. A CPU obtains a bandwidth of wavelengths with respect to each measuring point in accordance with the stored bandwidth of wavelengths. Then, measured intensities of light at the measuring points are used to add measured values across the measured value in a required range of bandwidth of optical frequencies. Moreover, correction is performed in accordance with a ratio of the bandwidth of wavelengths at each of the measuring points and the intervals of wavelength at the measuring points. Thus, an intensity of light at each of the measuring points is obtained.

4 Claims, 5 Drawing Sheets

METHOD OF CALCULATING OPTICAL FREQUENCY SPECTRUM

BACKGROUND OF THE INVENTION

1. Field of the Invention

The present invention relates to a method of calculating optical frequency spectrum for use in an optical-spectrum measuring apparatus for measuring optical spectrum characteristics of a light source.

2. Description of the Related Art

Figure 4:
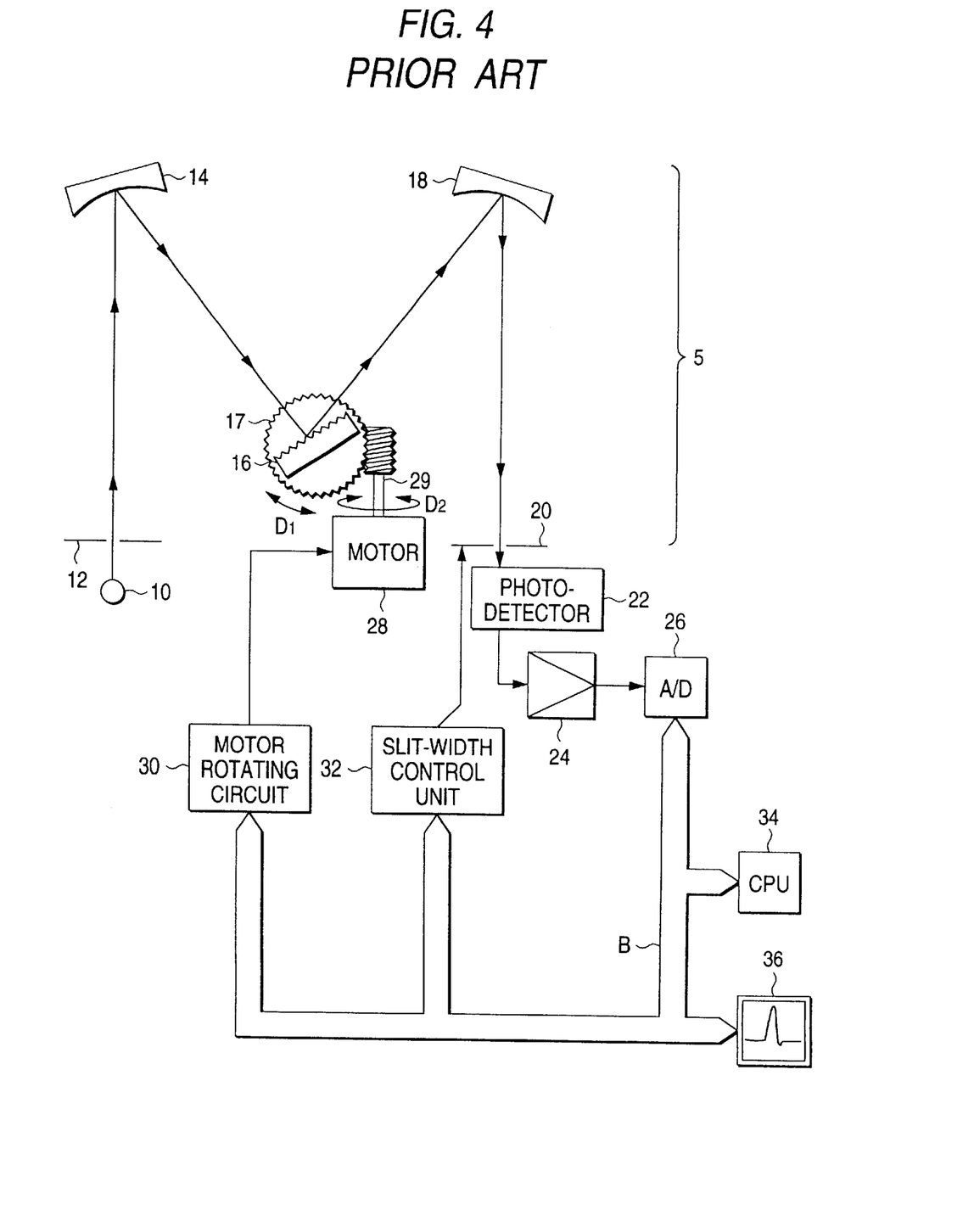
FIG. 4 is a block diagram showing the structure of a conventional optical spectrum measuring apparatus.

FIG. 4 is a block diagram showing the structure of a conventional optical-spectrum measuring apparatus.

Referring to FIG. 4, reference numeral 10 designates a light source containing a variety of wavelength components and capable of emitting light, the spectrum of which is to be measured. Reference numeral 12 designates an incident slit for limiting the intensity of light emitted from the light source 10. Reference numeral 14 designates a concave mirror for converting light made incident on the concave mirror 14 through the incident slit 12 into parallel light beams.

Reference numeral 16 designates a diffraction grating having the surface provided with a multiplicity of grooves so as to, for each wavelength, spatially split the parallel light beams converted by the concave mirror 14. The diffraction grating 16 is mounted on a stage 17 which is rotative in a direction indicated with symbol D1 so as to be rotated in the direction indicated with the symbol D1 when the stage 17 is rotated. Reference numeral 18 designates a concave mirror for focusing only a light beam made incident on the concave mirror 18 to the position of an emission slit 20, the light beam being included in the light beams split by the diffraction grating 16 for each wavelength. Reference numeral 20 designates the emission slit for limiting bandwidth of the wavelengths of the light beam focused to the position of the slit by the concave mirror 18.

The incident slit 12, the concave mirror 14, the diffraction grating 16, the concave mirror 18 and the emission slit 20 constitute a Czerny-Turner spectroscope.

Reference numeral 22 designates a photodetector, such as a photodiode, to convert the intensity of light emitted from the emission slit 20 into an electric signal. Reference numeral 24 designates an amplifier for amplifying the electric signal output from the photodetector 22. Reference numeral 26 designates an analog/digital converter (hereinafter referred to as an D/A converter) for converting the value amplified by the amplifier 24 into a digital signal.

In the drawing, reference numeral 28 designates a motor for rotating the stage 17 on which the diffraction grating 16 is mounted. When a rotating shaft 29 of the motor 28 is rotated in a direction indicated with symbol D2, the stage 17 and the diffraction grating 16 are rotated in the direction indicated with the symbol D1. Reference numeral 30 designates a motor rotating circuit for controlling the rotation of the rotating shaft 29 of the motor 28 in response to a control signal output from a CPU 34 to be described later.

Reference numeral 32 designates a slit-width control unit for changing the width of the emission slit 20 in response to a control signal output from the CPU 34 to be described later.

Reference numeral 36 designates a display unit, such as a CRT (Cathode Ray Tube) or a liquid crystal display unit. The CPU 34 is connected to the A/D converter 26, the motor rotating circuit 30, the slit-width control unit 32 and the display unit 36 through a bus B. The CPU 34 outputs a control signal for controlling each of the motor rotating circuit 30 and the slit-width control unit 32. Moreover, the CPU 34 calculates the digital signal output from the A/D converter 26 so as to display, for example, the spectrum distribution on the display unit 36.

In the foregoing structure, light emitted from the light source 10 is made incident on the incident slit 12. Light allowed to pass through the incident slit 12 is converted into parallel light beams by the concave mirror 14 so as to be made incident on the diffraction grating 16. The diffraction grating 16 is rotated by the motor 28 around a shaft which is in parallel with the many grooves formed thereon so as to make an arbitrary angle from the parallel light beams. The arbitrary angle is determined when the motor rotating circuit 30 controls the motor 28 in response to the control signal output from the CPU 34.

The diffraction grating 16 spatially splits incident parallel light beams for each wavelength. Among the wavelengths spatially split by the diffraction grating 16, only light having a wavelength determined by an angle made between a direction of transmission of the parallel light beams and the diffraction grating 16 is emitted to the concave mirror 18. The concave mirror 18 focuses only light having the wavelength, which has been made incident on the concave mirror 18, to the position of the slit of the emission slit 20. Only a wavelength component within the width of the emission slit 20 is allowed to pass through the emission slit 20. The slit-width control unit 32 sets the width of the emission slit 20 in response to the control signal output from the CPU 34.

The photodetector 22 receives light allowed to pass through the emission slit 20 to convert the light into an electric signal proportional to the intensity of the light. The amplifier 24 amplifies an output from the photodetector 22 to a voltage suitable to be input to the A/D converter 26. The A/D converter 26 converts an output from the amplifier 24 into a digital signal. The digital signal output from the A/D converter 26 is supplied to the CPU 34. The CPU 34 calculates the digital signal. The CPU 34 outputs a result (for example, spectrum distribution) of a calculation to the display unit 36 through the bus B. The display unit 36 displays contents in accordance with the result of the calculation output from the CPU 34.

The procedure of the measurement will now be described. The CPU 34 outputs a control signal to the slit-width control unit 32 so as to set the width of the emission slit 20. Then, the CPU 34 issues a command to the motor rotating circuit 30 to change the angle of the diffraction grating 16 so as to set a wavelength which is allowed to pass through the emission slit 20. Moreover, the CPU 34 fetches the intensity of light allowed to pass through the emission slit 20 from the output of the A/D converter 26. The CPU 34 outputs a control signal to the motor rotating circuit 30. Thus, the wavelength allowed to pass through the emission slit 20 is swept from a measurement-start wavelength to a measurement-completion wavelength. Characteristics about the relationship between the measuring wavelength and the intensity of light obtained repeatedly are displayed on the display unit 36.

Recently, in the field of the optical communication, an optical spectrum is usually displayed as an optical frequency spectrum, that is, a characteristic of the relationship between an optical frequency and the intensity of light in place of display as a characteristic of the relationship between a wavelength and the intensity of light. In the above case, the measuring wavelength at each of the measuring points is converted into an optical frequency in accordance with the characteristics about the relationship between the measuring wavelength and the intensity of light which have repeatedly been obtained. The optical frequency is, as an optical frequency spectrum, displayed on the display unit 36. Recently, some of optical spectrum measuring apparatuses put on the market have a function capable of selectively displaying an optical spectrum and an optical frequency spectrum.

Incidentally, the bandwidth RB (also called a wavelength resolution) allowed to pass through the spectrometer 5 of the czerny-Turner spectroscope type shown in FIG. 4 is substantially expressed by the following equation (1). Note that the following expression is satisfied under the conditions that the focal distance of the concave mirror 14 is the same as that of the concave mirror 18 and the width of the slit of the emission slit 20 is larger than that of the incident slit 12.

$$RB = \frac{2d}{m \cdot f} \cdot S \cdot \cos\beta \tag{1}$$

In the above equation, d is intervals among the grooves provided for the diffraction grating 16, m is the number of order of diffractions, f is the focal distance of each of the concave mirrors 14 and 18, S is the width of the slit of the emission slit 20 and $\beta$ is the angle made between a direction of light emitted to the concave mirror 18 which is included in light diffracted by the diffraction grating 16 and the normal of the diffraction grating 16.

The bandwidth of the wavelengths of the spectrometer 5 of the optical spectrum measuring apparatus must appropriately be set in accordance with the type of the light source when the measurement is performed. According to equation (1), the width of the emission slit 20 must be changed to change the bandwidth RB of the spectrometer 5. To arbitrarily set the bandwidth of the wavelengths of the spectrometer 5, the conventional technique has been arranged such that the width of the slit of the emission slit 20 is mechanically controlled by the slit-width control unit 32. Therefore, the structure is complicated excessively and a troublesome adjustment operation must be performed.

Figure 5:
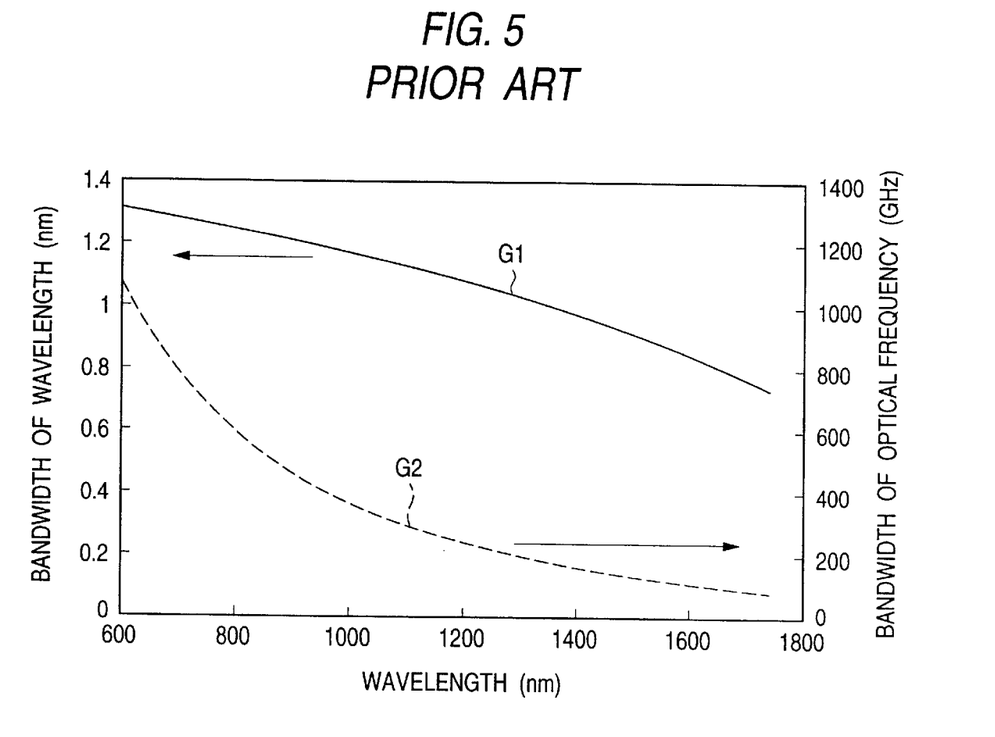
FIG. 5 is a graph showing an example of the characteristic of a spectrometer shown in FIG. 4.

When the measuring wavelength is changed, the diffraction grating 16 must be rotated in the direction indicated with the symbol D1. When the angle of the diffraction grating 16 made from the parallel light beams is changed, also the angle $\beta$ in equation (1) is changed. According to equation (1), change in the bandwidth of the wavelengths of the spectrometer 5 depends on the measuring wavelength. Therefore, the characteristic of the bandwidth of the wavelengths of the spectrometer 5 is, for example, as shown in FIG. 5. FIG. 5 is a graph showing an example of the characteristic of the spectrometer 5 shown in FIG. 4.

Referring to FIG. 5, a curve given symbol G1 indicates an example of the characteristic of the bandwidth of the wavelengths of the spectrometer 5 shown in FIG. 4 while a curve given symbol G2 indicates an example of the characteristic of the bandwidth of the optical frequencies.

In general, the optical spectrum of light to be measured is wider than the bandwidth of the wavelengths of the spectrometer 5. Therefore, if the spectrometer 5 has the bandwidth of the wavelengths having the characteristic shown in FIG. 5, the measured optical spectrum has a characteristic that the portion having a short wavelength is raised. Thus, there arises a problem that an accurate optical spectrum cannot be obtained.

Also when the optical spectrum is displayed as the characteristic about the relationship between the optical frequency and the intensity of light, a similar problem arises because change in the bandwidth of the optical frequencies of the spectrometer 5 depends on the measuring wavelength or the measuring optical frequency.

When, for example, the characteristic of the bandwidth of the wavelengths of the spectrometer 5 indicated with symbol G1 is converted into the characteristic of the bandwidth of the optical frequencies, a characteristic indicated by a curve indicated with symbol G2 is obtained. As compared with the bandwidth of the wavelengths, greater change occurs.

The conventional technique has the arrangement that the measured characteristic about the relationship between the wavelength and the intensity of light is used to simply convert the wavelength into the optical frequency so as to be used as the optical spectrum. Therefore, the foregoing problem cannot be overcome.

SUMMARY OF THE INVENTION

In view of the foregoing, an object of the present invention is to provide a method of calculating optical frequency spectrum which enables a spectrometer, which cannot arbitrarily change the width of the emission slit, when an optical frequency spectrum which is displayed with the characteristic about the relationship between the optical frequency and the intensity of light, to obtain an optical spectrum which is displayed with the bandwidth of optical frequencies which has arbitrarily been determined.

Another object of the present invention is to provide a method of calculating optical frequency spectrum which is capable of obtaining an accurate optical spectrum with respect to the bandwidth of optical frequencies, which has arbitrarily been determined even if change of the bandwidth of the wavelengths of the spectrometer depends on the measuring wavelength.

To achieve the above objects, according to an aspect of the present invention, there is provided a method of calculating an optical frequency spectrum, comprising the steps of: setting intervals of points for measuring an optical spectrum and a predetermined bandwidth of optical frequencies; measuring an intensity of light made incident on each of the set measuring points by using a spectrometer; setting a wavelength region determined by the measuring intervals and the bandwidth of the optical frequencies to a shorter wavelength side and a longer wavelength side at each of the measuring points; and adding an intensity of light to the measured intensity of light across the wavelength region thereby to obtain an intensity of light at each of the measuring points.

According to another aspect of the present invention, there is provided a method of calculating an optical frequency spectrum, comprising the steps of: setting intervals of points for measuring an optical spectrum and a predetermined bandwidth of optical frequencies; measuring an intensity of light made incident on each of the set measuring points by using a spectrometer; setting an optical frequency region determined by the measuring intervals and the bandwidth of the optical frequencies to a lower frequency side and a higher frequency side at each of the measuring points; and adding an intensity of light to the measured intensity of light across the optical frequency region thereby to obtain an intensity at each of the measuring points.

According to still another aspect of the present invention, there is provided a method of calculating an optical frequency spectrum, comprising the steps of: setting a bandwidth of wavelengths of a spectrometer corresponding to a measuring wavelength; setting measuring intervals of points for measuring an optical spectrum and a predetermined bandwidth of optical frequencies; measuring an intensity of light made incident on each of the set measuring points by using the spectrometer; obtaining, from the set bandwidth of the wavelengths, the bandwidth of wavelengths of the spectrometer to each of the points for measuring the optical spectrum; setting a wavelength region determined by the measuring intervals and the bandwidth of the optical frequencies to a shorter wavelength side and a higher wavelength side at each of the measuring points; adding an intensity of light to the measured intensity of light across the wavelength region thereby to obtain an intensity of light at each of the measuring points; and obtaining the intensity of light at each of the measuring points by correcting the intensity of light at each of the measuring points in accordance with a ratio of the bandwidth of the wavelengths and the intervals of the wavelengths.

DETAILED DESCRIPTION OF THE PREFERRED EMBODIMENT

Referring to the drawings, a method of calculating an optical frequency spectrum according to an embodiment of the present invention will now be described.

Prior to describing the embodiment of the present invention, symbols and terms which will be employed in the following description will now be described. Moreover, an optical spectrum measuring apparatus to which the method of calculating an optical frequency spectrum according to the embodiment of the present invention is applied will now be described.

The "measuring points" are discrete measuring points when the intensity of light is measured by changing the wavelength. Each of the measuring points is given a number. The number given to each of the measuring points is indicated with m (m is an integer). One wavelength corresponds to one measuring point, the wavelength being indicated with λ (m). The intensity of light which can be obtained at the measuring point is indicated with P (m).

When a wavelength range of, for example, 600 nm to 700 nm is measured at intervals of 0.1 nm, the wavelengths are λ (1)=600.0, λ (2)=600.1, λ (3)=600.2, ..., λ (1001)=700.0.

A value obtained by converting the wavelength at each of the measuring points into the optical frequency is indicated with F (m). When the optical frequency spectrum is shown, an XY graph is employed which has an axis of abscissa standing for F (m) and an axis of ordinate standing for P (m).

Figure 1:
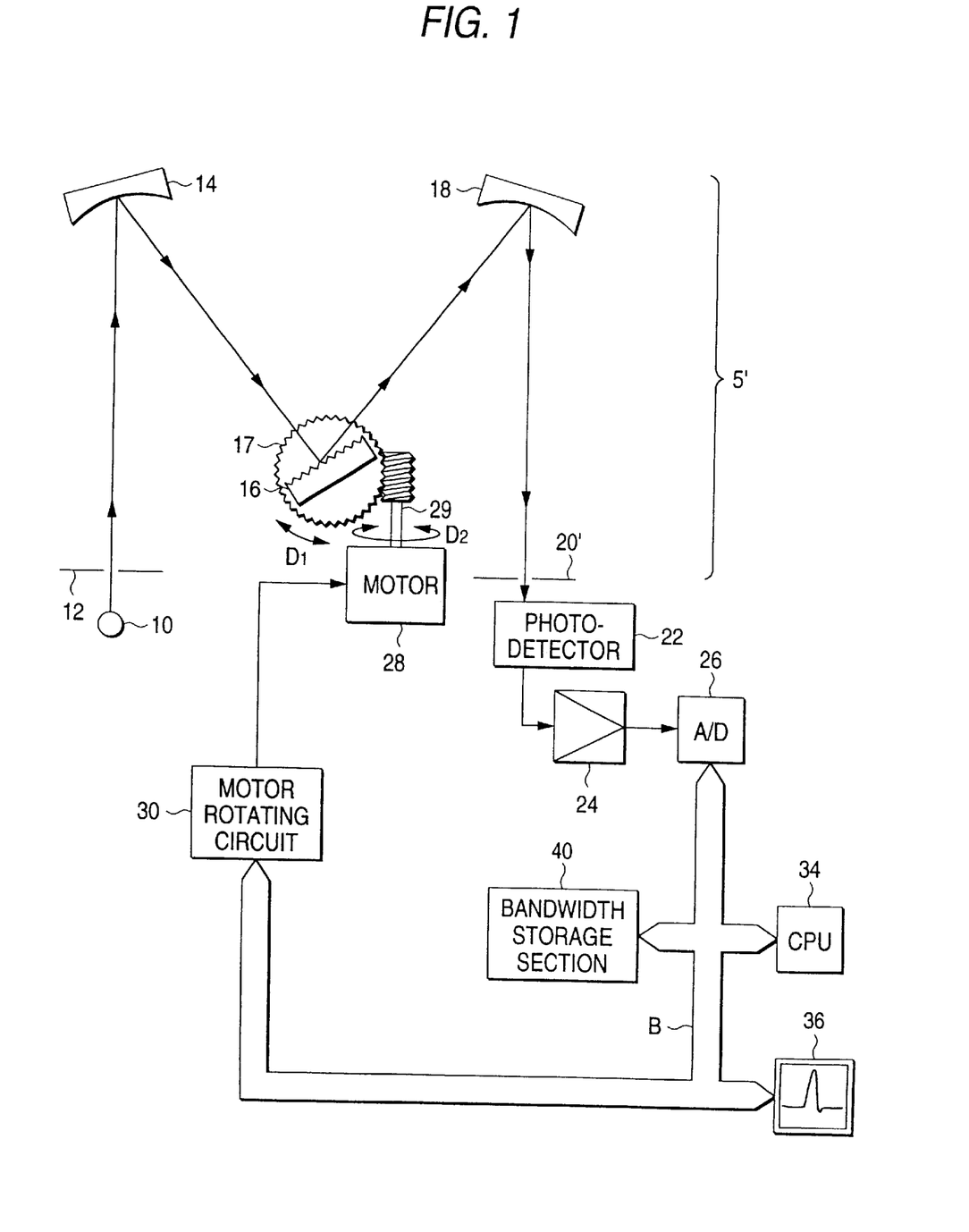
FIG. 1 is a block diagram showing the structure of an optical frequency spectrum measuring apparatus to which a method of calculating optical frequency spectrum according to an embodiment of the present invention is applied.

FIG. 1 is a block diagram showing the structure of an optical frequency spectrum measuring apparatus to which the method of calculating optical frequency spectrum according to the embodiment of the present invention is applied.

The optical frequency spectrum measuring apparatus shown in FIG. 1 is different from the conventional optical frequency spectrum measuring apparatus shown in FIG. 4. That is, the slit-width control unit 32 shown in FIG. 4 is omitted. Moreover, a spectrometer 5' has an emission slit 20' employed in place of the emission slit 20.

The emission slit 20' is a slit different from the conventional emission slit 20 which incorporates the slit, the width of which is changed, the emission slit 20' having a slit, the width of which is fixed. Another difference is the structure that a bandwidth storage section 40 is connected to the bus B.

The bandwidth storage section 40 stores the characteristic of the bandwidth of wavelengths allowed to pass through the spectrometer 5' with respect to the measuring wavelength of the spectrometer 5'. For example, bandwidths of wavelengths with respect to 600 nm to 1750 nm are stored in each of 10 nm. The above values obtained by performing measurements or calculations are previously stored.

Prior to describing the method of calculating optical frequency spectrum according to the embodiment of the present invention, the operation will now be described which is performed for obtaining the characteristic about the relationship between the frequency and the intensity of light after the optical spectrum of the characteristic about the relationship between the wavelength and the intensity of light has been obtained by using the apparatus shown in FIG. 1.

When the optical spectrum is measured, a process similar to the conventional process is performed. That is, light emitted from the light source 10 is made incident on the concave mirror 14 through the incident slit 12. Then, the light is converted into parallel light beams, and then is made incident on the diffraction grating 16. The light made incident on the diffraction grating 16 is spatially split. only light having the wavelength determined by the angle between the direction of incident light and the normal of the diffraction grating 16 is diffracted toward the concave mirror 18. The concave mirror 18 focuses the light to the slit of the emission slit 20'.

Only the wavelength component determined by the width of the slit of the emission slit 20' is allowed to pass through the emission slit 20' so as to be made incident on the photodetector 22. Incident light is converted into an electric signal proportional to the intensity of light by the photodetector 22 so as to be output from the photodetector 22. The signal output from the photodetector 22 is, by the amplifier 24, amplified to a voltage suitable to be input to the A/D converter 26. The amplified signal is converted into a digital signal by the A/D converter 26. The converted digital signal is supplied to the CPU 34. The CPU 34 calculates the digital signal.

After the CPU 34 has completed measurement of the intensity of light having a certain wavelength, the CPU 34 outputs a control signal to the motor rotating circuit 30. Thus, the motor 28 is rotated so that the angle between the direction of light emitted from the concave mirror 14 and the normal of the diffraction grating 16 is changed. When the angle is changed, the wavelength of light which is emitted from the emission slit 20' is changed by, for example, 0.1 nm.

After the CPU 34 has output the control signal, the CPU 34 calculates a supplied digital signal similarly to the above-mentioned operation. Thus, the CPU 34 measures a wavelength range, for example, from 1529 nm to 1579 nm at intervals of 0.1 nm to calculate the intensity of light having each wavelength. The wavelength range corresponds to an optical frequency range from about 189.8 THz to 196.0 THz.

Therefore, when the measured wavelength range is simply converted into the optical frequency range, an optical frequency spectrum can be obtained.

Figure 2:
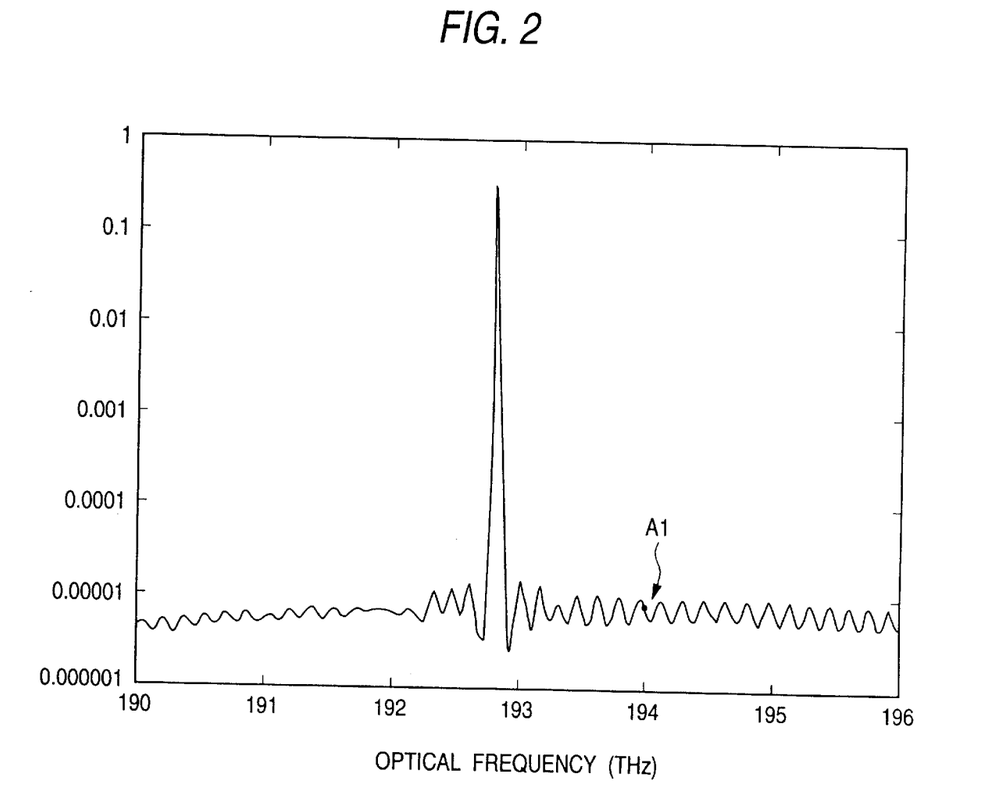
FIG. 2 is a graph showing an example of an optical spectrum of a DFB light beam obtained when the method of calculating optical frequency spectrum according to the embodiment of the present invention is not applied.

An example of the obtained optical frequency spectrum is shown in FIG. 2.

FIG. 2 is a graph showing an example of an optical spectrum of a DFB light beam obtained in a case where the method of calculating optical frequency spectrum according to this embodiment of the present invention is not applied.

As shown in FIG. 2, a waveform is obtained which has a peak of the intensity of light at a position near 192.8 THz. In right and left optical frequency regions of the peak, a waveform oscillating in the vicinity of an intensity of light of about 0.00001 mW is obtained.

The method of calculating optical frequency spectrum according to the embodiment of the present invention will now be described.

In this embodiment, a consideration is made that also the frequency band is changed when the wavelength of the spectrometer 5' is changed. Thus, the bandwidth of the wavelengths at each of the measuring points m is expressed as RB (m).

The method of calculating optical frequency spectrum according to the embodiment of the present invention is characterized by use of the characteristic of the bandwidth of the passed wavelengths with respect to the measuring wavelength stored in the bandwidth storage section 40 shown in FIG. 1.

The bandwidth storage section 40 stores the characteristic of the bandwidth of the passed wavelengths with respect to the measuring wavelength of the spectrometer 5'. For example, the bandwidths of wavelengths of the spectrometer 5' with respect to 600 nm to 1750 nm are stored in each of 10 nm. The above values are measured or calculated so as to previously be stored.

The following processes are performed when the CPU 34 shown in FIG. 1 executes a predetermined program.

Initially, the intervals of the wavelengths which are to be measured are set to wavelength intervals S. Then, the intensity of light is measured over the frequency band which must be measured. The measuring operation is the same as the above-mentioned operation.

Incidentally, the operator sets arbitrary bandwidth Rf of optical frequencies before or after the measurement. The bandwidth Rf of the optical frequencies may arbitrarily be set by the operator. For example, the bandwidth Rf of the optical frequencies is set to 100 GHz.

After the measurement has been completed, the bandwidth RB (m) of the spectrometer 5' with respect to each measuring point m is obtained in accordance with the bandwidth of the wavelengths stored in the bandwidth storage section 40. If the wavelength corresponding to the measuring point m is not stored, linear interpolation or the like is performed in accordance with a nearest passed bandwidth of the stored wavelength to obtain RB (m).

Then, a process for converting the bandwidth Rf of the optical frequencies set by the operator into the bandwidth of wavelengths is performed. Since the bandwidth of wavelengths varies depending on the measuring wavelength when the bandwidth of frequencies is the same, the converted bandwidth of the wavelengths is indicated with R0 (m). An equation for conversion is the following equation (2):

$$R0(m) = \frac{\lambda(m)^2 \times Rf}{c} \quad (2)$$

where c is the light velocity in vacuum.

Then, a range (the number of measuring points) N (m) of movement and addition is obtained by using the following equation (3). Since the bandwidth R0 (m) of the wavelengths varies at each of the measuring points as described above, also the range of movement and addition varies at each of the measuring points.

$$N(m) = \frac{R0(m)}{2 \times S} \quad (3)$$

Then, equation (4) is used to obtain intensity P' (m) of light with respect to bandwidth RBf of optical frequencies at each of the measuring points m.

$$P'(m) = \sum_{i=m-N(m)}^{m+N(m)} \left[ P(i) \cdot \frac{S}{RB(i)} \right] \quad (4)$$

With equation (4), the intensity P' (m) of light is a value obtained by performing movement and addition of the intensity P (m) at each of the measuring points m in the range of the bandwidth Rf of the optical frequencies and by correcting an error caused from measurement in the individual bandwidth RB (m) of wavelengths at the measuring points m. Therefore, data measured with the bandwidth RB (m) of the wavelengths can be converted into an optical spectrum in the bandwidth Rf of the optical frequencies.

Figure 3:
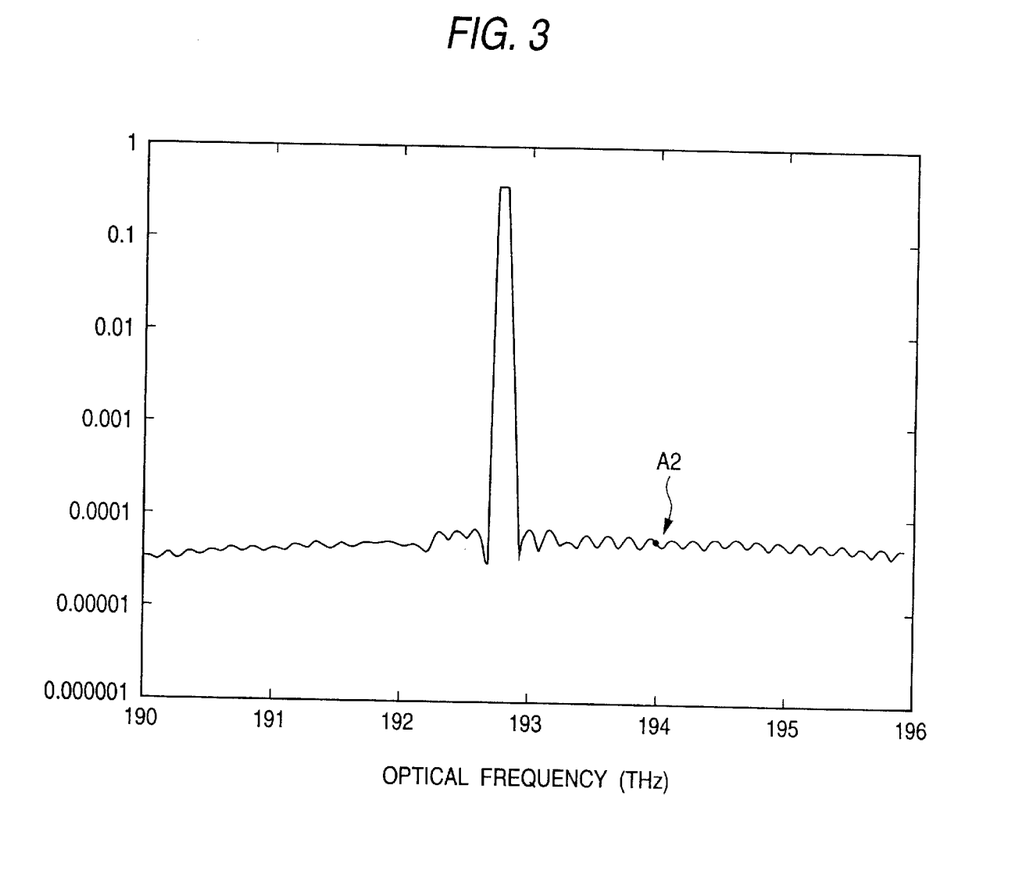
FIG. 3 is a graph showing an optical frequency spectrum which can be obtained when the method of calculating optical frequency spectrum according to the embodiment of the present invention is applied.

FIG. 3 is a graph showing an optical frequency spectrum obtainable when the method of calculating optical frequency spectrum according to the embodiment of the present invention is employed.

The optical frequency spectrum shown in FIG. 3 is obtained by performing correction such that the intensity of light at each of the measuring points m for measuring the optical spectrum shown in FIG. 2 is moved and added in a range of a bandwidth of 100 GHz of optical frequencies in accordance with equation (4).

For example, the value of measuring point A2 shown in FIG. 3 is obtained by performing correction such that the addition in a range of the bandwidth of the optical frequencies of 100 GHz across measuring point A1 shown in FIG. 2.

If a decimal portion is discarded when N (m) is not an integer, the width of the movement and addition is narrowed as compared with the bandwidth Rf of optical frequencies. Therefore, an error occurs. In this case, correction may be performed in consideration of the frequency band of wavelengths on the outside of the bandwidth Rf of optical frequencies as performed in the following equation (5):

$$P'(m) = \sum_{i=m-Na(m)}^{m+Na(m)} \left[ P(i) \cdot \frac{S}{RB(i)} \right] + \quad (5)$$

$$Nb(m) \cdot P(m - Na(m) - 1) \cdot \frac{S}{RB(m - Na(m) - 1)} +$$

$$Nb(m) \cdot P(m + Na(m) + 1) \cdot \frac{S}{RB(m + Na(m) + 1)}$$

Where Na(m) is an integer portion of N(m) and Nb(m) is a decimal portion of N(m).

The above-mentioned embodiment may be arranged such that light emitted from the light source 10 is transmitted to the spectrometer 5' through an optical fiber. In this case, an emission end of the optical fiber serves as the incident slit 12. Therefore, the incident slit 12 may be omitted from the structure.

The concave mirror 14 and the concave mirror 18 may be replaced by a common concave mirror. As an alternative to this, lenses may be substituted for the concave mirror 14 and the concave mirror 18. Moreover, the present invention may be applied to a two-stage spectrometer disclosed in Japanese Patent Unexamined Publication No. Hei. 6-221922.

The foregoing embodiment has been described about the structure in which the slit-width control unit 32 shown in FIG. 4 is omitted. However, the embodiment of the present invention may be applied to a structure having the slit-width control unit 32 as shown in FIG. 4. Also in this case, this embodiment enables an optical spectrum with respect to a bandwidth of optical frequencies which is different from the bandwidth of optical frequencies obtainable from a slit width which can be set by the slit-width control unit 32 so as to be calculated.

In the foregoing embodiment, the range which is to be measured is determined in accordance with the wavelength and the measuring points are determined at the same wavelength intervals. The principle of the present invention may be applied to a case in which the intervals among the measuring points are not positioned at the same wavelength intervals.

For example, the range which is to be measured may be determined with the optical frequency and the measuring points may be positioned at the same frequency intervals. In this case, a frequency region which is the same as a required bandwidth of optical frequencies is set to each of the measuring points to add intensities of light in this range.

Moreover, the present invention may be applied to a case in which the measuring points are positioned such that the diffraction grating 16 is rotated at angles of the same intervals. This is a case in which the diffraction grating 16 is rotated at a predetermined speed to measure each of the measuring points at predetermined intervals of time. Also in this case, a frequency region which is the same as a required bandwidth of optical frequencies may be set to each of the measuring points to add intensities of light in this range.

As described above, according to the present invention, measured intensities of light at the measuring points for the measured optical spectrum are moved and added such that the bandwidth of optical frequencies is made to be constant in the axial direction of the wavelength. Therefore, an effect can be obtained that an optical spectrum can be obtained with an arbitrary bandwidth of optical frequencies even if the spectrometer cannot set an arbitrary width of the emission slit.

The bandwidth of resolutions with respect to the wavelengths of the spectrometer is previously stored. In addition, the moved and added intensities of light is multiplied with the ratio of the bandwidth of wavelengths of the spectrometer with respect to the measuring wavelength and the intervals among measuring wavelengths. Therefore, even if change in the bandwidth of the wavelengths of the spectrometer depends on the measuring wavelength, an effect can be obtained that a correct optical frequency spectrum with respect to an arbitrary bandwidth of optical frequencies can be obtained.

What is claimed is:

1. A method of calculating an optical frequency spectrum, comprising the steps of:
    setting intervals of points for measuring an optical spectrum and a predetermined bandwidth of optical frequencies;
    measuring an intensity of light made incident on each of the set measuring points by using a spectrometer;
    setting a wavelength region determined by the measuring intervals and the bandwidth of the optical frequencies to a shorter wavelength side and a longer wavelength side at each of the measuring points; and
    adding an intensity of light to the measured intensity of light across the wavelength region thereby to obtain an intensity of light at each of the measuring points.

2. A method of calculating an optical frequency spectrum, comprising the steps of:
    setting intervals of points for measuring an optical spectrum and a predetermined bandwidth of optical frequencies;
    measuring an intensity of light made incident on each of the set measuring points by using a spectrometer;
    setting an optical frequency region determined by the measuring intervals and the bandwidth of the optical frequencies to a lower frequency side and a higher frequency side at each of the measuring points; and
    adding an intensity of light to the measured intensity of light across the optical frequency region thereby to obtain an intensity of light at each of the measuring points.

3. A method of calculating an optical frequency spectrum, comprising the steps of:
    setting a bandwidth of wavelengths of a spectrometer corresponding to a measuring wavelength;
    setting measuring intervals of points for measuring an optical spectrum and a predetermined bandwidth of optical frequencies;
    measuring an intensity of light made incident on each of the set measuring points by using the spectrometer;
    obtaining, from the set bandwidth of the wavelengths, the bandwidth of wavelengths of the spectrometer to each of the points for measuring the optical spectrum;
    setting a wavelength region determined by the measuring intervals and the bandwidth of the optical frequencies to a shorter wavelength side and a higher wavelength side at each of the measuring points;
    adding an intensity of light to the measured intensity of light across the wavelength region thereby to obtain an intensity of light at each of the measuring points; and
    obtaining the intensity of light at each of the measuring points by correcting the intensity of light at each of the measuring points in accordance with a ratio of the bandwidth of the wavelengths and the intervals of the wavelengths.

4. The method according to claim 3, wherein when a shortest wavelength portion and a longest wavelength portion of the wavelength region exist between the measuring points,
    the intensity of light is corrected in the shortest wavelength portion in accordance with the intensity of light at a measuring point deviated from the wavelength region and nearest the shortest wavelength portion, a degree of proximity of the shortest wavelength portion to the nearest measuring point and a ratio of a bandwidth of wavelengths and the intervals of wavelengths at the nearest measuring point,
    while the intensity of light is corrected in the longest wavelength portion in accordance with the intensity of light at a measuring point deviated from the wavelength region and nearest the longest wavelength portion, a degree of proximity of the longest wavelength portion to the nearest measuring point and a ratio of the bandwidth of the wavelengths and the intervals of the wavelengths at the nearest measuring point.

* * * * *